United States Patent [19]

Pesenacker

[11] Patent Number: 4,732,975
[45] Date of Patent: Mar. 22, 1988

[54] DISAZO COMPOUNDS

[75] Inventor: Manfred Pesenacker, Kelkheim, Fed. Rep. of Germany

[73] Assignee: Hoechst Aktiengesellschaft, Frankfurt, Fed. Rep. of Germany

[21] Appl. No.: 332,818

[22] Filed: Dec. 21, 1981

[30] Foreign Application Priority Data

Dec. 23, 1980 [DE] Fed. Rep. of Germany ....... 3048610

[51] Int. Cl.$^4$ .................. C09B 33/153; C09B 35/035; D06P 1/44; D06P 3/79
[52] U.S. Cl. .................................. 534/742; 162/162; 106/23; 106/288 Q; 106/308 Q; 534/575; 534/581; 534/745; 534/887
[58] Field of Search .............. 260/176, 152, 157, 154, 260/155, 156, 158, 160; 534/742

[56] References Cited

U.S. PATENT DOCUMENTS

| | | | |
|---|---|---|---|
| 2,164,785 | 7/1939 | Rossander | 260/160 X |
| 2,286,391 | 6/1942 | Sparus | 260/160 X |
| 2,741,657 | 4/1956 | Schmid et al. | 260/160 |
| 2,944,050 | 7/1960 | Haubrich et al. | 260/160 X |
| 3,627,750 | 12/1971 | Ronco | 260/174 |
| 3,838,145 | 9/1974 | Altermatt | 260/160 X |
| 3,956,266 | 5/1976 | Mory et al. | 260/157 |
| 3,963,694 | 6/1976 | Mory et al. | 260/157 X |
| 4,169,830 | 10/1979 | Hunger | 260/157 |
| 4,296,028 | 10/1981 | Moiso et al. | 260/160 |

FOREIGN PATENT DOCUMENTS

| | | | |
|---|---|---|---|
| 849376 | 9/1960 | United Kingdom | 260/176 |
| 1381213 | 1/1975 | United Kingdom | 260/176 |

OTHER PUBLICATIONS

Chemical Abstracts, vol. 51 (1957)-3154/55 (Societe).

Primary Examiner—Floyd D. Higel
Attorney, Agent, or Firm—Curtis, Morris & Safford

[57] ABSTRACT

Compounds of the general formula

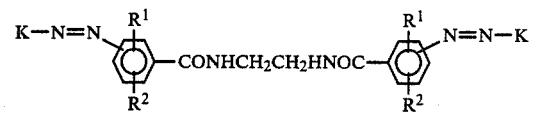

in which $R^1$ and $R^2$ are identical or different and denote hydrogen, chlorine or bromine, methyl, ethyl, methoxy, ethoxy or nitro and K denotes identical or different radicals of enolizable ketomethylene compounds which do not contain groups imparting solubility in water, are obtained by coupling one equivalent of the bis-diazonium compound obtained by bisdiazotizing the diamine of the formula

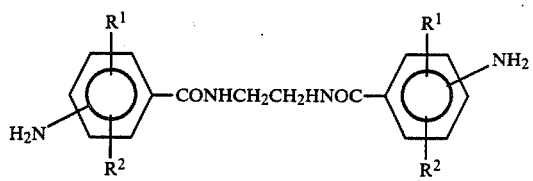

in which $R^1$ and $R^2$ have the meaning mentioned above, with 2 equivalents of one or more compounds of the formula KH in which K has the meaning mentioned above. These disazo compounds are pigments which have a high tinctorial strength and good fastness to migration, light, heat and chemicals.

7 Claims, No Drawings

DISAZO COMPOUNDS

The invention relates to disazo compounds of the general formula I

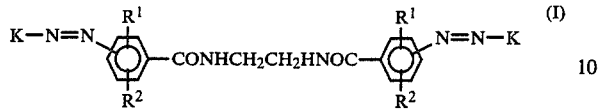

in which $R^1$ and $R^2$ can be identical or different and denote hydrogen, chlorine or bromine, methyl, ethyl, methoxy, ethoxy or nitro.

In the formula I, K denotes radicals of identical or different coupling components which do not contain groups imparting solubility in water. K is, in particular, the radical of an enolizable ketomethylene compound, such as, for example, an acetoacetanilide or N-heterocyclic compound. Preferred radicals K of this type correspond to the formulae II–VI,

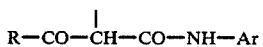
(II)

in which R is methyl or phenyl and Ar is a radical of the formula

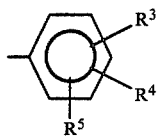
(IIa)

in which $R^3$, $R^4$ and $R^5$, which are identical or not all the same, denote hydrogen, chlorine, bromine, lower alkyl, lower alkoxy, lower alkanoylamino, benzoylamino or nitro, or Ar is a radical from among those of the formulae (IIb)–(IIh)

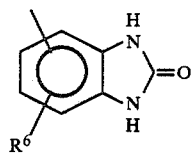
(IIb)

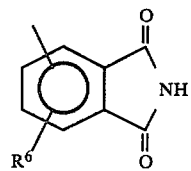
(IIc)

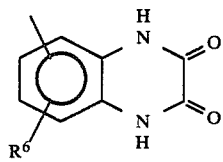
(IId)

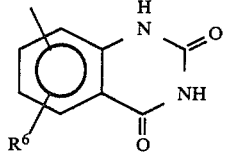
(IIe)

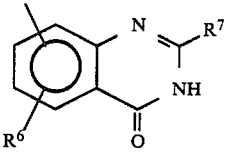
(IIf)

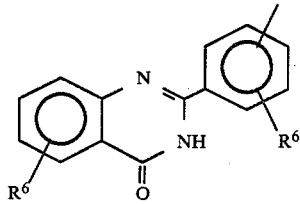
(IIg)

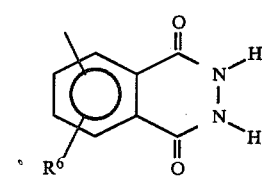
(IIh)

in which $R^6$ is hydrogen, chlorine, bromine, lower alkyl, lower alkoxy, lower carboalkoxy or nitro, and $R^7$ is the phenyl radical, which is optionally substituted by $R^6$, or

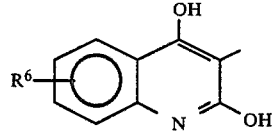
(III)

in which $R^8$ denotes phenyl, tolyl or chlorophenyl and $R^9$ denotes methyl, lower carboalkoxy, carbonamido or lower alkanoylamino; or

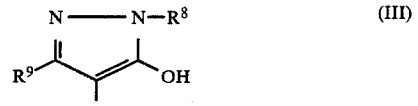
(IV)

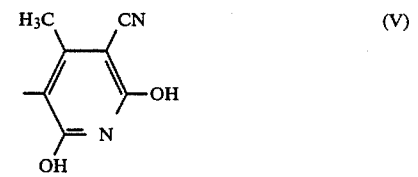
(V)

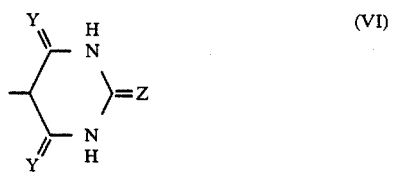
(VI)

in which Z represents oxygen, or sulfur, =NCN or =NH and Y denotes oxygen or =NH.

Here and in the following text the term "lower" denotes radicals having 1–4 C atoms in regard to alkyl, alkoxy and alkanoyl and denotes alkoxy radicals having 1–4 C atoms in regard to carboalkoxy.

The invention also relates to a process for the preparation of the disazo compounds according to formula I, which comprises bisdiazotizing one or more compounds of the formula VII

in which $R^1$ and $R^2$ have the meaning mentioned for formula I, and coupling the product with 2 equivalents of a coupling component KH in which K has the meaning mentioned for formula I.

The invention also relates to the use of the disazo compounds according to the invention as colorants, in particular as pigments. Disazo pigments which are of particular technical importance in this regard are those derived from coupling components of the formula IIb, since these pigments have a very high stability to heat and are suitable for coloring polyolefines at temperatures up to about 280° C.

The following are examples of diamines of the formula VII which can be employed: N,N'-bis-(4-aminobenzoyl)-ethylenediamine, N,N'-bis-(4-amino-3-nitrobenzoyl)ethylenediamine, N,N'-bis-(3-aminobenzoyl)-ethylenediamine, N,N'-bis-(3-amino-4-methylbenzoyl)-ethylenediamine, N,N'-bis-(3-amino-4-methoxybenzoyl)-ethylenediamine, N,N'-bis-(3-amino-4-chlorobenzoyl)-ethylenediamine, or mixtures of such diamines.

The coupling of the bisdiazo compounds of amines of the general formula VII with the coupling components KH is carried out in a conventional manner, for example by combination in an aqueous medium. In this reaction it is possible to employ a single coupling component or a mixture of several coupling components.

The diamino compounds of the formula VII can be prepared by known processes, for example by subjecting correspondingly substituted nitrobenzoyl chlorides or acylaminobenzoylamino compounds to a condensation reaction with ethylenediamine in the presence of organic solvents or in an aqueous medium, and subsequently reducing the nitro groups or hydrolizing the acylamino groups, respectively.

The bisdiazotization of the diamines of the formula VII can be effected, for example, by means of alkali metal nitrites and a mineral acid, but can also be effected by means of nitrosylsulfuric acid. In this reaction, and in the subsequent coupling, it can be advantageous to add surface-active agents, such as, for example, nonionic, anionic or cationic dispersing agents.

The diazotization and coupling can also be carried out in the presence of suitable organic solvents, such as, for example, glacial acetic acid, lower alkanols, dioxane, formamide, dimethylformamide, dimethyl sulfoxide, pyridine or N-methylpyrrolidone. In order to achieve the full tinctorial strength and a particularly advantageous crystal structure, it is often appropriate to heat the coupling mixture for some time, for example to boil it or to keep it at a temperature above 100° C. under pressure, if appropriate in the presence of an organic solvent, such as ethanol, o-dichlorobenzene, dimethyl-formamide or N-methylpyrrolidone, or in the presence of resin soap. Particularly clear and deep pigments are obtained by means of the products according to the invention if, after the coupling reaction, the moist press cakes or the dried powders are subjected to a subsequent heat treatment with organic solvents, such as alcohols, for example lower alkanols, pyridine, glacial acetic acid, dimethylformamide, N-methylpyrrolidone, dimethyl sulfoxide or aromatic solvents, such as chlorobenzene, dichlorobenzene, nitrobenzene, or xylene or if the pigments are subsequently ground, with the addition of grinding auxiliaries. The pigments can also be prepared in the presence of a carrier material, for example, barytes.

The new pigments are insoluble in water and insoluble in the customary organic solvents and are suitable for the production of printing inks, gloss paints and emulsion paints, and for coloring rubber, plastics and natural or synthetic resins. They are also suitable for pigment printing on substrates, particularly textile fiber materials or other sheet-like structures, such as, for example, paper.

The pigments can also be used for other fields of application, for example in a finely divided form for spin-dyeing artificial silk made from viscose, or cellulose ethers or esters, polyamides, polyurethanes, polyglycol terephthalate or polyacrylonitriles, or for coloring paper.

The pigments can be processed easily in the media mentioned. The colorations have clear shades, very good depth of color and fastness to migration and good to very good fastness to light. They are resistant to the action of heat and the effects of chemicals, above all solvents.

In the examples which follow, unless otherwise specified, percentages relate to weight. Parts are likewise to be understood as meaning parts by weight.

EXAMPLE 1

24.45 parts of N,N'-bis-(4-methyl-3-aminobenzoyl)-ethylenediamine in 200 parts of water containing 70 parts of 31% strength hydrochloric acid are stirred for 45 minutes at room temperature and are then cooled to 0° C. with ice and diazotized by adding, under the surface of the reaction mixture, a solution of 11 parts of sodium nitrite in 35 parts of water. The mixture is stirred for one hour at 0°–5° C., the excess of nitrite is then destroyed by means of sulfamic acid and the bisdiazonium salt solution is clarified.

At the same time, 36 parts of 5-acetoacetylaminobenzimidazol-2-one are suspended in 300 parts of water and are dissolved, at 18°–20° C., by means of 47 parts of 33% strength sodium hydroxide solution. After adding one part of kieselguhr, the mixture is filtered and the filtrate is transferred to the coupling vessel, in which a mixture of 500 parts of water, 43 parts of 33% strength sodium hydroxide solution, 45 parts of glacial acetic acid and a solution of 6 parts of a commercially available mixture of long-chain alkyldimethylbenzylammonium chlorides in 100 parts of water is thoroughly stirred. 30 minutes after the 5-acetoacetylaminobenzimidazol-2-one has been precipitated, the clarified bisdiazonium salt solution is run in, under the surface of the suspension, in the course of 60 minutes. The pigment suspension is then stirred for a further 45 minutes at room temperature and then for a further 60 minutes at 80°–85° C. and is then filtered. The press cake is washed free from salt and is suspended in 400 parts of water, and the suspension is charged to a pressure vessel and stirred for 5 hours at 160° C., after adding 600 parts of isobutanol.

After the isobutanol has been distilled off as an azeotrope, the aqueous pigment suspension is filtered and the filter cake is dried at 65° C. This gives 59.7 parts of an orange pigment of the structure

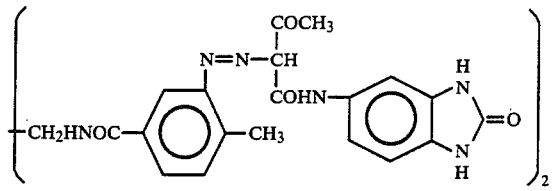

Incorporating this product into an alkyl resin/melamine resin clear lacquer gives yellow-orange colorations which have unobjectionable fastness to overlacquering. Low-pressure polyethylene which has been colored by the pigment is distinguished by having very high heat resistance. Both in the lacquer and in the plastic, the fastness to light is also very good.

EXAMPLE 2

27.6 parts of N,N'-bis-(4-chloro-3-aminobenzoyl)-ethylenediamine are diazotized as in Example 1.

At the same time, 42 parts of 2,5-dimethoxy-4-chloroacetoacetanilide are suspended in 350 parts of water and dissolved at 15°–18° C. by means of 40 parts of 33% strength sodium hydroxide solution. After adding one part of kieselguhr, the mixture is filtered and the filtrate is transferred into the coupling vessel, in which a mixture of 500 parts of water, 47 parts of 33% strength sodium hydroxide solution, 42 parts of glacial acetic acid and a solution of 6 parts of a mixture of long-chain alkyldimethylbenzylammonium chlorides in 100 parts of water is thoroughly stirred.

The suspension of 2,5-dimethoxy-4-chloroacetoacetanilide is stirred for 20 minutes at 18°–20° C. and the clarified bisdiazonium salt solution is then run in, under the surface of the suspension, in the course of 60 minutes. In the course of this, the pH value falls from 6.0 to 4.5 and it is then kept at 4.5 by adding 2N sodium hydroxide solution. The mixture is stirred, first for a further 60 minutes at room temperature, and then for a further 60 minutes at 80°–85° C. The pigment is then filtered off and the filter cake is washed thoroughly with water. The moist filter cake is introduced into 1800 parts of glacial acetic acid and stirred for 6 hours at 100° C., after adding 6 parts of a mixture of long-chain alkyldimethylbenzylammonium chlorides. After the product has been filtered off, it is washed with alcohol and then with water and is dried at 65° C. This gives 65.6 g of a yellow pigment powder of the structure

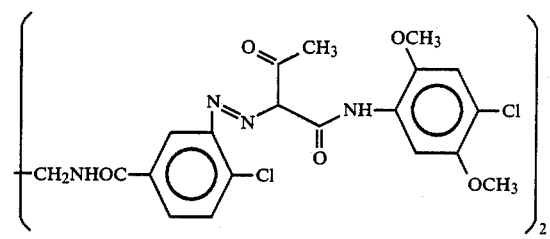

which produces yellow colorations having unobjectionable fastness to overlacquering when incorporated into an alkyd resin/melamine resin clear lacquer. Low-pressure polyethylene which has been colored with the product is distinguished by good stability to heat. Both in the lacquer and in prints and in the plastic, the fastness to light is also good.

The pigments listed in the following table can be prepared in accordance with Examples 1 and 2:

| Example | Diamine | Coupling Component | Shade |
| --- | --- | --- | --- |
| 3 | [H₂N—⟨C₆H₄⟩—CONHCH₂—]₂ | 5-acetoacetylaminobenzimidazol-2-one | greenish-tinged yellow |
| 4 | [H₂N—⟨C₆H₄⟩—CONHCH₂—]₂ | 6-methyl-5-acetoacetylaminobenzimidazol-2-one | reddish-tinged yellow |
| 5 | [H₂N—⟨C₆H₄⟩—CONHCH₂—]₂ | 2,4-dimethoxy-5-chloroacetoacetanilide | yellow |
| 6 | [H₂N—⟨C₆H₄⟩—CONHCH₂—]₂ | 2,5-dimethoxy-4-chloroacetoacetanilide | reddish-tinged yellow |

-continued

| Example | Diamine | Coupling Component | Shade |
|---|---|---|---|
| 7 | 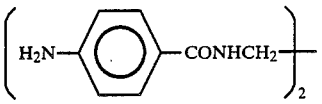 | 7-chloro-5-acetoacetylaminobenzimidazol-2-one | yellow |
| 8 | 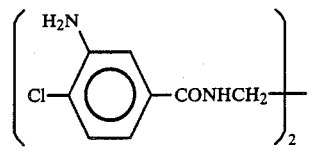 | 5-acetoacetylaminobenzimidazol-2-one | orange |
| 9 | 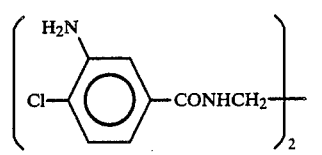 | 2,4-dimethoxy-5-chloroacetoacetanilide | yellow |
| 10 | 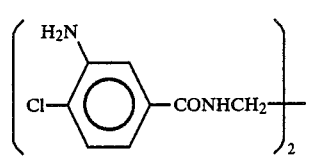 | 2,5-dimethoxy-4-chloroacetoacetanilide | reddish-tinged yellow |
| 11 | 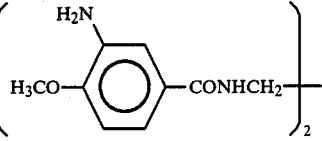 | 5-acetoacetylaminobenzimidazol-2-one | yellowish-tinged orange |
| 12 | 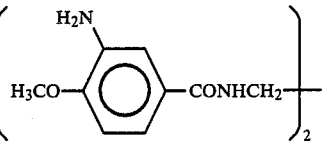 | 7-chloro-5-acetoacetylaminobenzimidazol-2-one | yellow |
| 13 | 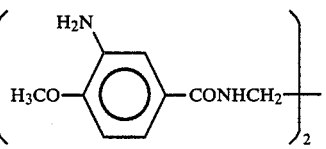 | 2,5-dimethoxy-4-chloroacetoacetanilide | greenish-tinged yellow |
| 14 | 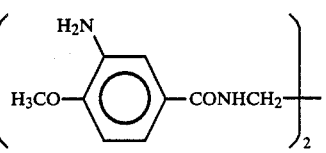 | 1-(p-tolyl)-3-methylpyrazol-5-one | reddish-tinged yellow |
| 15 | 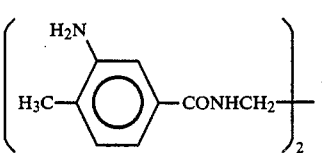 | 2-methoxyacetoacetanilide | greenish-tinged yellow |
| 16 | 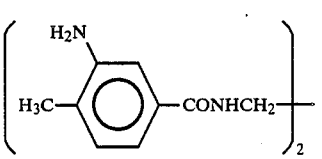 | 2,5-dimethoxy-4-chloroacetoacetanilide | yellow |

-continued

| Example | Diamine | Coupling Component | Shade |
| --- | --- | --- | --- |
| 17 | ![H2N, H3C-phenyl-CONHCH2]2 | 1-(p-tolyl)-3-methylpyrazol-5-one | reddish-tinged yellow |
| 18 | ![H2N, H3C-phenyl-CONHCH2]2 | 3-cyano-4-methyl-6-hydroxypyrid-2-one | reddish-tinged yellow |
| 19 | ![O2N, H2N-phenyl-CONHCH2]2 | 5-acetoacetylaminobenzimidazol-2-one | reddish-tinged yellow |
| 20 | ![O2N, H2N-phenyl-CONHCH2]2 | 2,5-dimethoxy-4-chloroacetoacetanilide | reddish-tinged yellow |

I claim:

1. A compound of the formula

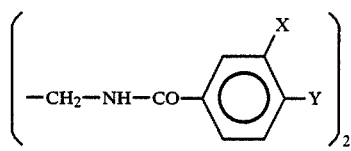

wherein one of the substituents X and Y means hydrogen, chlorine, methyl, methoxy or nitro, and the other means

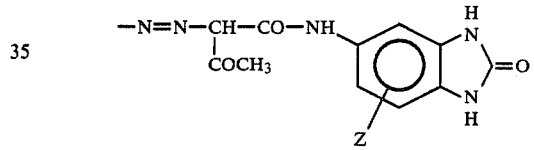

wherein Z is hydrogen, chlorine or methyl.

2. The compound as claimed in claims 1, wherein Y is methyl and Z is hydrogen.

3. The compound as claimed in claim 1, wherein X and Z are hydrogen.

4. The compound as claimes in claim 1, wherein X is hydrogen and Z is 6-methyl.

5. The compound as claimed in claim 1, wherein Y is chlorine and Z is hydrogen.

6. The compound as claimed in claim 1, wherein Y is methoxy an Z is hydrogen.

7. The compound as claimed in claim 1, wherein Y is methoxy and Z is 7-chlorine.

* * * * *